United States Patent
Lavy et al.

(10) Patent No.: US 11,112,283 B2
(45) Date of Patent: Sep. 7, 2021

(54) OFFLINE SENSOR CALIBRATION

(71) Applicant: Intel Corporation, Santa Clara, CA (US)

(72) Inventors: Lev Y. Lavy, Jerusalem (IL); Yehiel Shilo, Jerusalem (IL); Ke Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 15/768,745

(22) PCT Filed: Dec. 21, 2015

(86) PCT No.: PCT/CN2015/098017
§ 371 (c)(1),
(2) Date: Apr. 16, 2018

(87) PCT Pub. No.: WO2017/106995
PCT Pub. Date: Jun. 29, 2017

(65) Prior Publication Data
US 2018/0299302 A1  Oct. 18, 2018

(51) Int. Cl.
*G01D 18/00* (2006.01)
*G01D 3/10* (2006.01)

(52) U.S. Cl.
CPC .............. *G01D 18/002* (2013.01); *G01D 3/10* (2013.01); *G01D 18/00* (2013.01)

(58) Field of Classification Search
CPC ........ G01D 18/00; G01D 18/002; G01D 3/10; G01C 17/38; G01C 25/005; G01C 25/00; G01P 21/00; G01P 15/00; G01R 33/0035

USPC ............ 73/1.38, 514.35, 708; 324/202, 601; 702/85, 98–99, 141, 150, 189
See application file for complete search history.

(56) References Cited

U.S. PATENT DOCUMENTS

| | | | |
|---|---|---|---|
| 9,310,477 B1* | 4/2016 | Sampigethaya | G01S 13/91 |
| 2006/0218172 A1* | 9/2006 | Mestha | G01J 3/02 |
| 2007/0128047 A1* | 6/2007 | Gonnella | F04B 43/088 |
| | | | 417/2 |
| 2008/0022027 A1* | 1/2008 | Tsuboi | G06F 13/26 |
| | | | 710/264 |

(Continued)

FOREIGN PATENT DOCUMENTS

| CN | 104121932 A | 10/2014 |
|---|---|---|
| CN | 104215264 A | 12/2014 |

(Continued)

OTHER PUBLICATIONS

International Search Report and Written Opinion for International Patent Application No. PCT/CN2015/098017, dated Aug. 29, 2016, 12 pages.

*Primary Examiner* — Jeffrey P Aiello
(74) *Attorney, Agent, or Firm* — Jordan IP Law, LLC

(57) ABSTRACT

Systems, apparatuses and methods may provide for detecting one or more trigger condition on a mobile platform and activating an offline calibration of one or more sensors on the mobile platform in response to the one or more trigger conditions. Additionally, an operational profile of the one or more sensors may be updated based on the offline condition. In one example, the trigger conditions include one or more of a time condition, a temperature condition, a motion condition or a system event condition.

25 Claims, 3 Drawing Sheets

(56) References Cited

U.S. PATENT DOCUMENTS

| | | | | |
|---|---|---|---|---|
| 2014/0275850 A1* | 9/2014 | Venkatraman | .......... | G01S 19/19 |
| | | | | 600/301 |
| 2014/0321503 A1* | 10/2014 | Niederberger | ........... | G01K 1/20 |
| | | | | 374/137 |
| 2014/0355649 A1* | 12/2014 | Niederberger | ........... | G01K 7/42 |
| | | | | 374/152 |
| 2015/0192477 A1* | 7/2015 | Sacchetti | ................. | G01K 1/20 |
| | | | | 374/152 |
| 2016/0327389 A1* | 11/2016 | Uzunovic | .............. | G01C 17/38 |

FOREIGN PATENT DOCUMENTS

| | | | | |
|---|---|---|---|---|
| CN | 104583725 A | 4/2015 | | |
| WO | WO 2014085755 | * 11/2012 | ............. | G01F 23/00 |

* cited by examiner

OFFLINE SENSOR CALIBRATION

CROSS REFERENCE TO RELATED APPLICATIONS

This application is a U.S. National Phase Patent Application which claims benefit to International Patent Application No. PCT/CN2015/098017 filed on Dec. 21, 2015.

TECHNICAL FIELD

Embodiments generally relate to sensors. More particularly, embodiments relate to offline sensor calibration.

BACKGROUND

Mobile devices such as mobile phones and smart tablets may include various sensors that provide data to applications running on the mobile device. For example, a mobile phone might include a magnetometer that provides magnetic field strength data to a compass application running on the mobile phone. If there is a repeatable difference (e.g., structural error) between the expected output of the sensor and the actual output of the sensor, calibration may be conducted so that measurements made by the sensor may be compensated in real-time to remove the errors. Conventional approaches to calibration may take place in the factory and on a per model basis in which average structural error data is applied to all mobile devices of a particular model. Such an approach may result in measurement inaccuracies due to structural variability between devices.

While online calibration of the sensor may be conducted at runtime (e.g., while the sensor is providing data to the application), online calibration may result in low initial accuracy until the sensor output converges on the expected output. Moreover, online calibration may call for unusual usage scenarios such as, for example, placement of the device on a flat surface in a face-up orientation that may not typically occur while the application is running (e.g., during game play when the device is used as a game controller). Indeed, sensors undergoing factory calibration and/or online calibration may still be susceptible to temperature variations.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
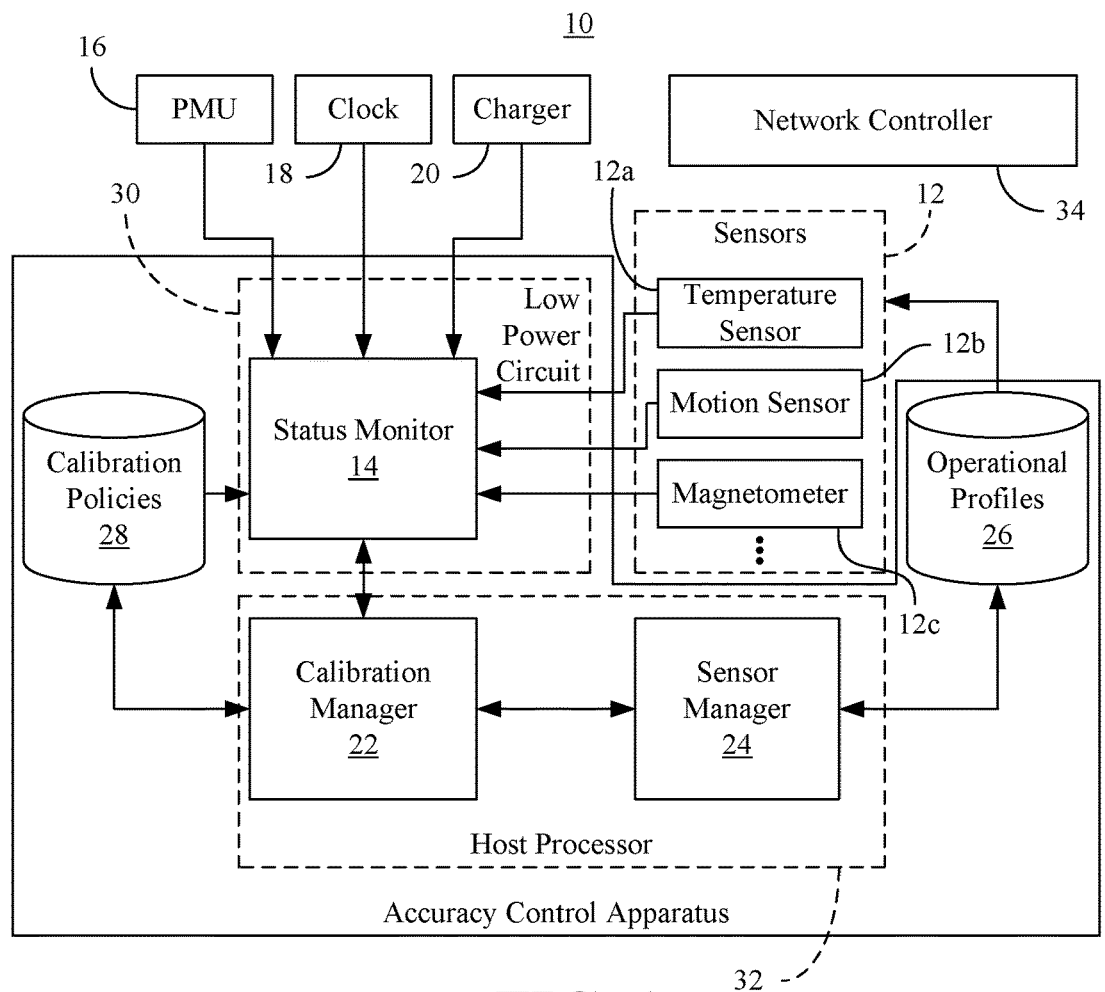
FIG. 1 is a block diagram of an example of a mobile platform having an accuracy control apparatus according to an embodiment.

Turning now to FIG. 1, a calibratable mobile platform 10 is shown. The mobile platform 10 may include, for example, a notebook computer, tablet computer, convertible tablet, smart phone, wearable computer, personal digital assistant (PDA), mobile Internet device (MID), media player, etc., or any combination thereof. In the illustrated example, one or more sensors 12 (12a-12c) such as, for example, a temperature sensor 12a, a motion sensor 12b (e.g., gyroscope, accelerometer), a magnetometer 12c, etc., are communicatively coupled to a status monitor 14. The status monitor 14 may also be communicatively coupled to one or more additional platform components such as, for example, a power management unit (PMU) 16, a clock 18, a charger 20, and so forth. The status monitor 14 may generally detect one or more trigger conditions on the mobile platform 10, wherein a calibration manager 22 may activate an offline calibration of the one or more sensors 12 in response to the one or more trigger conditions. Moreover, a sensor manager 24 may update operational profile(s) of the sensors 12 in, for example, an operational profile database 26 based on the offline calibration. Each operational profile may generally indicate the compensation to be applied to the sensor 12 in real-time in order to remove/offset measurement errors.

The trigger conditions may include, for example, a time condition (e.g., expiration of a certain amount of time) that is detected based on a signal from the clock 18, a temperature condition (e.g., a difference between the current temperature and a temperature associated with a previous offline calibration) that is detected based on a signal from the temperature sensor 12a, a motion condition (e.g., stationary, non-stationary) that is detected based on a signal from the motion sensor 12b, a system event condition, and so forth. The system event condition may include, for example, a power state (e.g., a particular ACPI/Advanced Configuration low power state) that is detected based on a signal from the PMU 16, a charging state (e.g., battery powered, charging) that is detected based on a signal from the charger 20, a battery level (e.g., percent charged) that is detected based on a signal from the charger 20, etc.

The trigger conditions may be registered and/or maintained in data structure such as, for example, a calibration policy database 28, which may be updated by the calibration manager 22 based on the offline calibration. Updating the calibration policy database 28 may include adding, removing and/or otherwise modifying the trigger conditions to ensure that optimal calibration results are obtained (e.g., in a closed-loop fashion). Of particular note is that the illustrated status monitor 14 is implemented in a low power circuit 30 such as, for example, a sensor hub that virtualizes one or more of the sensors 12, and the calibration manager 22 and the sensor manager 24 may be implemented in a host processor 32 (e.g., central processing unit/CPU). Implementing the status monitor 14 in the low power circuit 30, which consumes less power than the host processor 32, may provide for a smaller memory signature and reduced power consumption prior to activation of the calibration manager 22. Implementing the status monitor 14 in the low power circuit 30 may also reduce the runtime load on the host processor 32 that contains the calibration manager 22. In this regard, the calibration manager 22 may use relatively complex calibration procedures that are more suitable for execution on the host processor 32, depending on the sensor 12 being calibrated. The illustrated mobile platform 10 also includes a network controller 34 (e.g., Bluetooth, Wi-Fi, Near Field Communications/NFC) to conduct off-platform communications.

Figure 2:
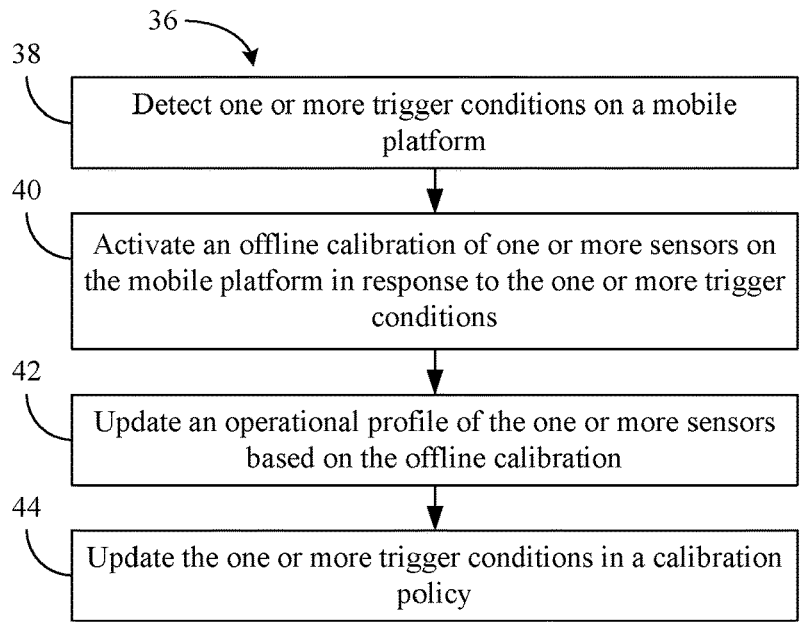
FIG. 2 is a flowchart of an example of a method of controlling sensor accuracy according to an embodiment.

FIG. 2 shows a method 36 of controlling sensor accuracy. The method 36 may generally be implemented in an architecture such as, for example, the low power circuit 30 (FIG. 1) and/or the host processor 32 (FIG. 1), already discussed. More particularly, the method 36 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 38 provides for detecting one or more trigger conditions on a mobile platform, wherein an offline calibration of one or more sensors (e.g., temperature sensor, gyroscope, accelerometer, magnetometer) on the platform may be activated at block 40 in response to the one or more trigger conditions. As already noted, the trigger conditions may include, for example, time conditions, temperature conditions, motion conditions, system event conditions, etc., or any combination thereof. The trigger conditions may be detected based on data, signals and/or information from hardware (e.g., sensors), software (e.g., operating system/OS), etc., or any combination thereof. More particularly, the temperature conditions may include, for example, the difference between the current temperature and a temperature associated with a previous offline calibration being greater than a particular threshold. In this regard, effective temperature compensation may be achieved by capturing sensor measurement data points that are sufficiently spread out (e.g., five degrees Celsius or more). Offline calibration may be particularly suitable for temperature compensation because the compensation is not tied to operation of an application that consumes data from the sensor in question during the calibration. Rather, the temperature measurements may be obtained across a much broader period of time (e.g., overnight and/or when the user is not otherwise interacting with the mobile platform/device).

As already noted, the system event condition may include a power state, a charging state, a battery level, and so forth. For example, the power state condition might call for the mobile platform being in a certain system-level sleep state (e.g., ACPI "Sx" state), the charging state condition may indicate that mobile device is being charged and/or the battery level condition may call for the battery level being above a certain threshold. With regard to the charging state, connecting a charger to a mobile platform may cause the mobile platform to gradually heat up. This phenomenon may be leveraged so that when a charging state is detected, an offline calibration to achieve temperature compensation may be conducted. Thus, the offline calibration may include a temperature compensation that is activated in response to the charging state corresponding to a battery of the mobile platform being charged. Such an approach may render very high quality calibration results due to the charger heating the mobile platform. The system event conditions may be detected/redirected as interrupts in a hardware layer using a common interface (e.g., general purpose input output/GPIO) or any other suitable format.

An operational profile of the one or more sensors may be updated at block 42 based on the offline calibration. The operational profile may indicate, for example, the amount of compensation to be applied to real-time measurements of the sensor(s). Additionally, illustrated block 44 updates at least one of the one or more trigger conditions in a calibration policy.

Figure 3:
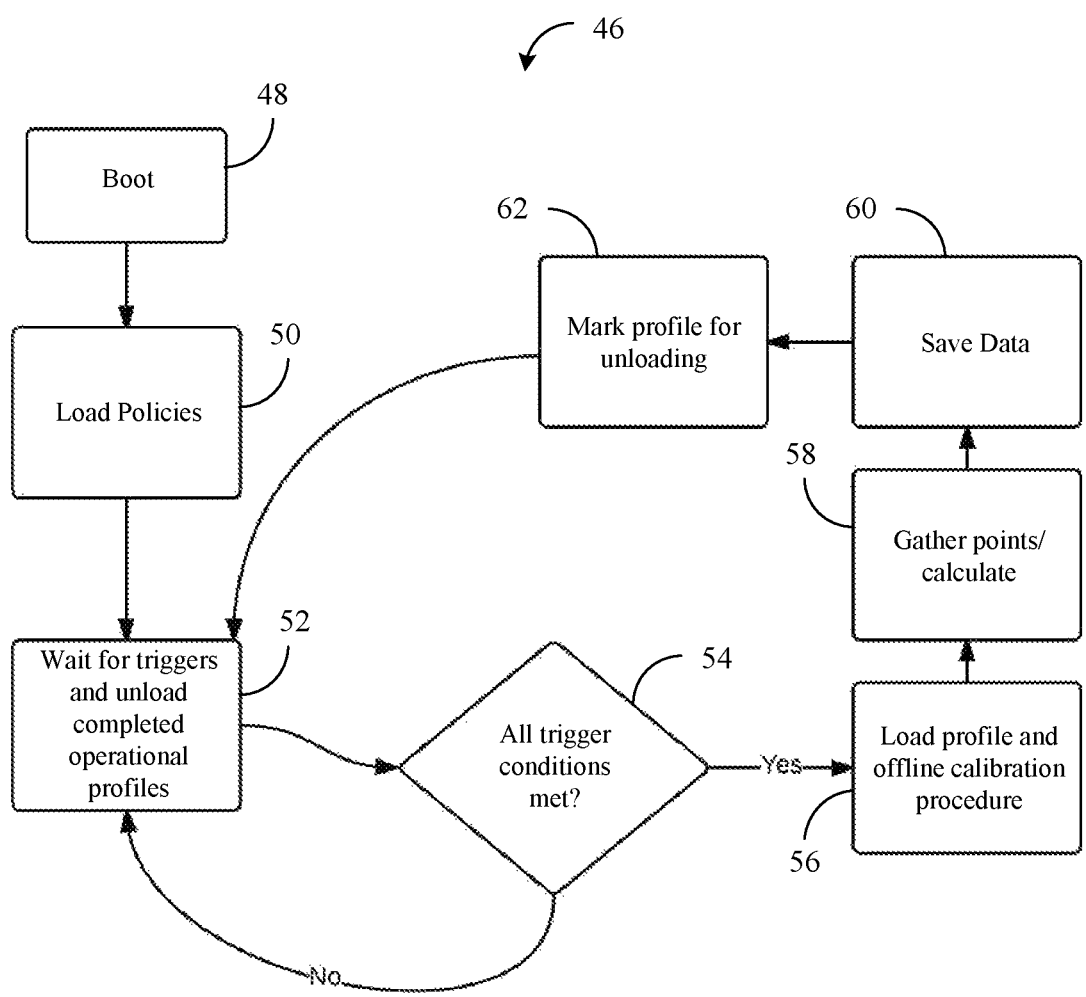
FIG. 3 is a flowchart of an example of a method of managing calibration procedures according to an embodiment.

FIG. 3 shows a method 46 of managing calibration procedures. The method 46 may generally be implemented in an architecture such as, for example, the low power circuit 30 (FIG. 1) and/or the host processor 32 (FIG. 1), already discussed. More particularly, the method 46 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 48 provides for conducting a system boot, wherein one or more calibration policies may be loaded (e.g., to a low power circuit) at block 50 and the calibration policies may include one or more trigger conditions. Block 52 may wait for the one or more trigger conditions to be detected (e.g., via hardware interrupts, timer expirations, sampled signals) and unload any completed operational profiles from a data structure such as, for example, the operational profile database 26 (FIG. 1) to one or more sensors on a mobile platform. If it is determined at block 54 that all trigger conditions have been met for a particular sensor, illustrated block 56 loads an operational profile and offline calibration procedure for the sensor in question (e.g., to a host processor). One or more data points may be gathered and/or calculated at block 58 in accordance with the offline calibration procedure. Illustrated block 60 saves the data from block 58, wherein the resulting operational profile may be marked for unloading to the platform sensor at block 62. The illustrated method 46 then returns to block 52 to wait for the one or more trigger conditions to be detected. If it is determined at block 54 that all trigger conditions have not been met, the illustrated method 46 returns to block 52.

Figure 4:
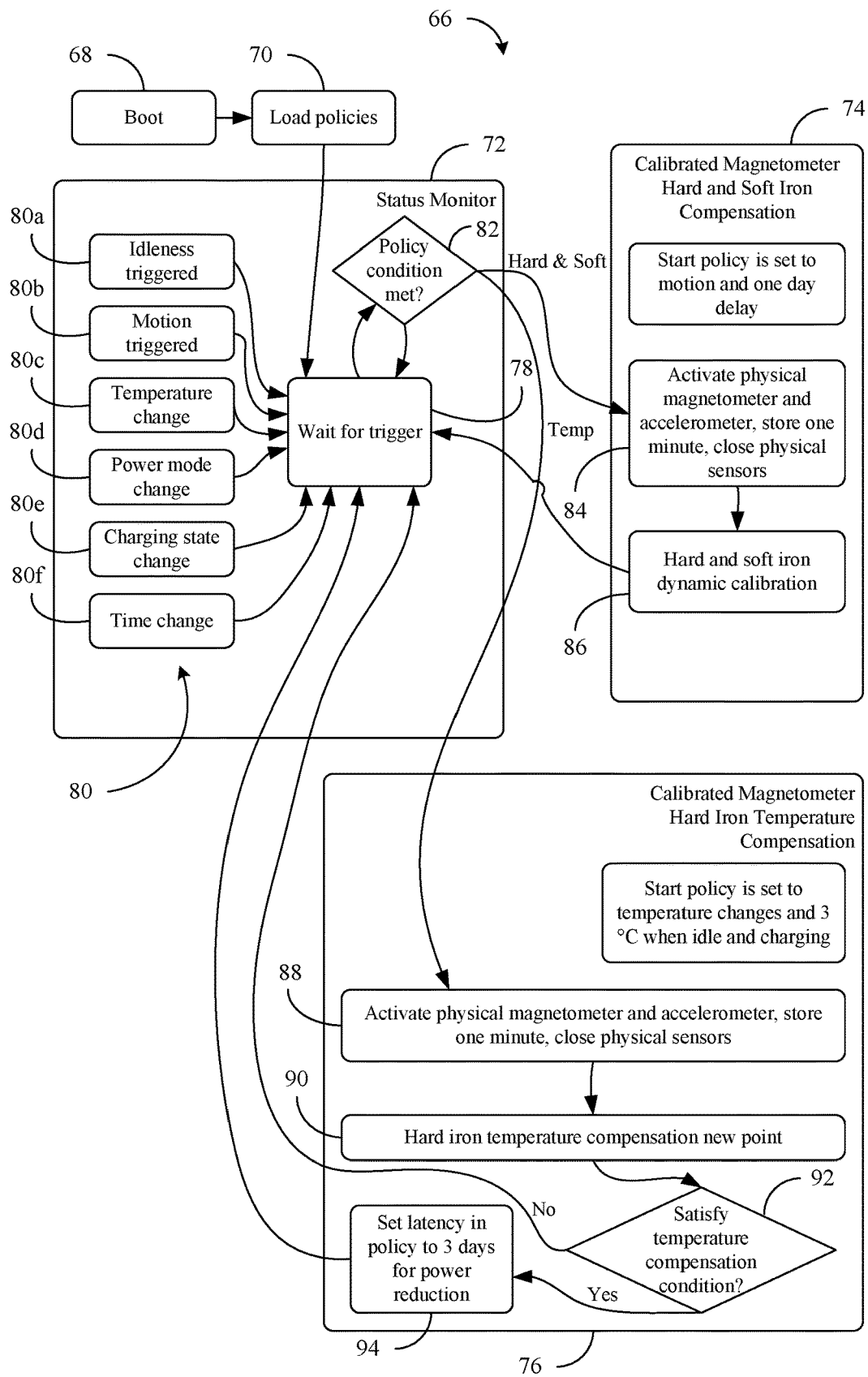
FIG. 4 is a flowchart of an example of a method of calibrating a magnetometer according to an embodiment.

FIG. 4 shows a method 66 of calibrating a magnetometer. The method 66 may generally be implemented in an architecture such as, for example, the low power circuit 30 (FIG. 1) and/or the host processor 32 (FIG. 1), already discussed. More particularly, the method 46 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 68 provides for conducting a system boot, wherein one or more calibration policies may be loaded at block 70. In general, a status monitor 72 may control the triggering of a hard and soft iron compensation procedure 74 and/or a hard iron temperature compensation procedure 76 (e.g., in a host processor) based on one or more triggers in a policy condition.

Block 78 may wait for one or more trigger conditions 80 (80a-80f) such as, for example, an idleness condition 80a (e.g., idleness triggered), a motion condition 80b (e.g., motion triggered), a temperature condition 80c (e.g., temperature change), a power state condition 80d (e.g., power mode change), a charging state condition 80e (e.g., charging state change), a time condition 80f (e.g., time change), and so forth. When a trigger condition is detected, illustrated block 82 determines whether the detected trigger condition satisfies the policy condition.

The sensitivity of magnetometers to other magnetic objects may generally have a negative impact on accuracy.

For example, magnetized ferromagnetic components mounted on nearby printed circuit boards (PCBs) may produce a "hard iron effect" on a magnetometer in a handheld device. Moreover, a "soft iron effect" may result from the Earth's magnetic field inducing an interfering magnetic field onto normally un-magnetized ferromagnetic components of nearby PCBs.

For example, the hard and soft iron compensation procedure 74 might have a start policy that is set to motion and one day of delay being detected. The hard iron temperature compensation procedure 76, on the other hand, may have a start policy that is set to a temperature change of three degrees Celsius when the mobile platform is idle and charging. If the detected trigger condition satisfies the hard and soft iron compensation condition, illustrated block 84 activates a physical magnetometer and accelerometer, stores one minute of data, and closes/deactivates the physical sensors. A hard and soft iron dynamic calibration may be conducted at block 86 based on the stored data.

If the detected trigger condition satisfies the hard iron temperature compensation condition, illustrated block 88 activates the physical magnetometer and accelerometer, stores one minute of data, and closes/deactivates the physical sensors. A new data point for the hard iron temperature compensation may be set at block 90, wherein a determination may be made at block 92 as to whether a temperature compensation condition is met based on the new data point and the stored data. If so, illustrated block 94 sets a latency in the policy to three days in order to reduce power and the method 66 returns to block 78. If the temperature compensation condition is not met at block 92, the method 66 may return to block 78 without changing the latency of the policy. Table I below shows example of conditions and compensation procedures that may be used for different types of sensors.

TABLE I

| Calibration Type | Condition for calibration | Trigger logic when sensor is not fully calibrated | Calibration Procedure |
| --- | --- | --- | --- |
| Gyroscope offset temperature compensation | Platform is stable | Idle + temperature threshold + time delay + charging state | Polynomial fit for offset temperature dependence |
| Gyroscope scale | Platform is in motion | Motion + time delay | Using accelerometer fusion for scale correction in slow motion |
| Accelerometer offset temperature dependency | Platform is stable | Tabletop + temperature threshold + time interval | Polynomial fit for offset temperature dependence |
| Accelerometer scale and offset | Platform is stable | Idle | Ellipsoid fit |
| Magnetometer hard iron temperature dependency | Platform is stable | Idle + temperature threshold + time delay | Polynomial fit for offset temperature dependence |
| Magnetometer soft and hard iron | Platform is in motion | Motion + time delay | Ellipsoid fit |

Additional Notes and Examples

Example 1 may include a calibratable mobile platform comprising a controller to conduct communications, one or more sensors, a status monitor to detect one or more trigger conditions on the mobile platform, a calibration manager to activate an offline calibration of the one or more sensors in response to the one or more trigger conditions and a sensor manager to update an operational profile of the one or more sensors based on the offline calibration.

Example 2 may include the mobile platform of Example 1, wherein the one or more trigger conditions include one or more of a time condition, a temperature condition, a motion condition or a system event condition.

Example 3 may include the mobile platform of Example 2, wherein the temperature condition includes a difference between a current temperature and a temperature associated with a previous offline calibration.

Example 4 may include the mobile platform of Example 2, wherein the system event condition includes one or more of a power state, a charging state or a battery level.

Example 5 may include the mobile platform of Example 1, wherein the calibration manager is to update the one or more trigger conditions in a calibration policy.

Example 6 may include the mobile platform of any one of Examples 1 to 5, wherein the one or more sensors include one or more of a gyroscope, an accelerometer or a magnetometer.

Example 7 may include the mobile platform of any one of Examples 1 to 5, further including a host processor, and a low power circuit, wherein the status monitor is to be implemented on the low power circuit, the calibration manager is to be implemented on the host processor, and the low power circuit is to consume less power than the host processor.

Example 8 may include an accuracy control apparatus comprising a status monitor to detect one or more trigger conditions on a mobile platform, a calibration manager to activate an offline calibration of one or more sensors on the mobile platform in response to the one or more trigger conditions and a sensor manager to update an operational profile of the one or more sensors based on the offline calibration.

Example 9 may include the apparatus of Example 8, wherein the one or more trigger conditions include one or more of a time condition, a temperature condition, a motion condition or a system event condition.

Example 10 may include the apparatus of Example 9, wherein the temperature condition includes a difference between a current temperature and a temperature associated with a previous offline calibration.

Example 11 may include the apparatus of Example 9, wherein the system event condition includes one or more of a power state, a charging state or a battery level.

Example 12 may include the apparatus of Example 11, wherein the offline calibration is to include a temperature compensation that is activated in response to the charging state corresponding to a battery of the mobile platform being charged.

Example 13 may include the apparatus of any one of Examples 8 to 12, wherein one or more of a gyroscope, an accelerometer or a magnetometer are calibrated.

Example 14 may include a method of controlling sensor accuracy, comprising detecting one or more trigger conditions on a mobile platform, activating an offline calibration of one or more sensors on the mobile platform in response to the one or more trigger conditions and updating an operational profile of the one or more sensors based on the offline calibration.

Example 15 may include the method of Example 14, wherein the one or more trigger conditions include one or more of a time condition, a temperature condition, a motion condition or a system event condition.

Example 16 may include the method of Example 15, wherein the temperature condition includes a difference between a current temperature and a temperature associated with a previous offline calibration.

Example 17 may include the method of Example 15, wherein the system event condition includes one or more of a power state, a charging state or a battery level.

Example 18 may include the method of Example 14, further including updating the one or more trigger conditions in a calibration policy.

Example 19 may include the method of any one of Examples 14 to 18, wherein one or more of a gyroscope, an accelerometer or a magnetometer are calibrated.

Example 20 may include at least one non-transitory computer readable storage medium comprising a set of instructions, which when executed by a mobile platform, cause the mobile platform to detect one or more trigger conditions on the mobile platform, activate an offline calibration of one or more sensors on the mobile platform in response to the one or more trigger conditions and update an operational profile of the one or more sensors based on the offline calibration.

Example 21 may include the at least one non-transitory computer readable storage medium of Example 20, wherein the one or more trigger conditions include one or more of a time condition, a temperature condition, a motion condition or a system event condition.

Example 22 may include the at least one non-transitory computer readable storage medium of Example 21, wherein the temperature condition includes a difference between a current temperature and a temperature associated with a previous offline calibration.

Example 23 may include the at least one non-transitory computer readable storage medium of Example 21, wherein the system event condition includes one or more of a power state, a charging state or a battery level.

Example 24 may include the at least one non-transitory computer readable storage medium of Example 23, wherein the offline calibration is to include a temperature compensation that is activated in response to the charging state corresponding to a battery of the mobile platform being charged.

Example 25 may include the at least one non-transitory computer readable storage medium of any one of Examples 20 to 24, wherein one or more of a gyroscope, an accelerometer or a magnetometer are calibrated.

Example 26 may include an accuracy control apparatus comprising means for detecting one or more trigger conditions on a mobile platform, means for activating an offline calibration of one or more sensors on the mobile platform in response to the one or more trigger conditions, and means for updating an operational profile of the one or more sensors based on the offline calibration.

Example 27 may include the apparatus of Example 26, wherein the one or more trigger conditions are to include one or more of a time condition, a temperature condition, a motion condition or a system event condition.

Example 28 may include the apparatus of Example 27, wherein the temperature condition is to include a difference between a current temperature and a temperature associated with a previous offline calibration.

Example 29 may include the apparatus of Example 27, wherein the system event condition is to include one or more of a power state, a charging state or a battery level.

Example 30 may include the apparatus of Example 26, further including means for updating the one or more trigger conditions in a calibration policy.

Example 31 may include the apparatus of any one of Examples 26 to 30, wherein one or more of a gyroscope, an accelerometer or a magnetometer are to be calibrated.

Thus, techniques described herein may activate sensors for calibration based on triggers and policies rather than depending only on user activation. An offline calibration manager may handle registration for triggers according to the policies and activate high level sensors when policy constraints are met. Such an approach may achieve accurate temperature compensation because it may activate sensors across a wide range of temperatures, times and activities. The result may be a mobile platform that is calibrated at all times while maintaining low power consumption. Accordingly, techniques may provide for an enhanced user experience, increased accuracy, temperature compensation, reduced runtime computation loads and simplified sensor calibration.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile platform comprising:
   a controller to conduct communications;
   one or more sensors, wherein the one or more sensors include a temperature sensor, a motion sensor, and a magnetometer;
   a status monitor, in communication with the one or more sensors, to detect one or more trigger conditions on the mobile platform, wherein the one or more trigger conditions are to be set in a policy database and include a time condition, temperature condition, a motion condition, and a system event condition, and wherein the status monitor is to control the initiation of one or more of a hard and soft iron compensation procedure or a hard iron temperature compensation procedure based on the one or more trigger conditions;
   a calibration manager to activate an offline calibration of the one or more sensors in response to the one or more trigger conditions; and
   a sensor manager to update an operational profile of the one or more sensors based on the offline calibration, wherein the sensor manager is to update the operational profile in an operational profile database to indicate a compensation to be applied to the one or more sensors in real-time in order to offset measurement errors.

2. The mobile platform of claim 1, wherein the one or more trigger conditions include one or more of a time condition, a temperature condition, a motion condition or a system event condition.

3. The mobile platform of claim 2, wherein the temperature condition includes a difference between a current temperature and a temperature associated with a previous offline calibration.

4. The mobile platform of claim 2, wherein the system event condition includes one or more of a power state, a charging state or a battery level.

5. The mobile platform of claim 1, wherein the calibration manager is to update the one or more trigger conditions in a calibration policy.

6. The mobile platform of claim 1, wherein the one or more sensors include one or more of a gyroscope or an accelerometer.

7. The mobile platform of claim 1, further including:
   a host processor; and
   a low power circuit, wherein the status monitor is to be implemented on the low power circuit, the calibration manager is to be implemented on the host processor, and the low power circuit is to consume less power than the host processor.

8. An apparatus comprising:
   a status monitor, in communication with one or more sensors, to detect one or more trigger conditions on a mobile platform, wherein the one or more sensors include a temperature sensor, a motion sensor, and a magnetometer, and the one or more trigger conditions are to be set in a policy database and include a time condition, temperature condition, a motion condition, and a system event condition, and wherein the status monitor is to control the initiation of one or more of a hard and soft iron compensation procedure or a hard iron temperature compensation procedure based on the one or more trigger conditions;
   a calibration manager to activate an offline calibration of one or more sensors on the mobile platform in response to the one or more trigger conditions; and
   a sensor manager to update an operational profile of the one or more sensors based on the offline calibration, wherein the sensor manager is to update the operational profile in an operational profile database to indicate a compensation to be applied to the one or more sensors in real-time in order to offset measurement errors.

9. The apparatus of claim 8, wherein the one or more trigger conditions include one or more of a time condition, a temperature condition, a motion condition or a system event condition.

10. The apparatus of claim 9, wherein the temperature condition includes a difference between a current temperature and a temperature associated with a previous offline calibration.

11. The apparatus of claim 9, wherein the system event condition includes one or more of a power state, a charging state or a battery level.

12. The apparatus of claim 11, wherein the offline calibration is to include a temperature compensation that is activated in response to the charging state corresponding to a battery of the mobile platform being charged.

13. The apparatus of claim 8, wherein one or more of a gyroscope, an accelerometer or a magnetometer are calibrated.

14. A method comprising:
    detecting one or more trigger conditions on a mobile platform, wherein the one or more trigger conditions are set in a policy database and include a time condition, temperature condition, a motion condition, and a system event condition, and wherein the one or more trigger conditions control the initiation of one or more of a hard and soft iron compensation procedure or a hard iron temperature compensation procedure;
    activating an offline calibration of one or more sensors on the mobile platform in response to the one or more trigger conditions, wherein the one or more sensors include a temperature sensor, a motion sensor, and a magnetometer; and
    updating an operational profile of the one or more sensors based on the offline calibration, wherein the operational profile is updated in an operational profile database to indicate a compensation to be applied to the one or more sensors in real-time in order to offset measurement errors.

15. The method of claim 14, wherein the one or more trigger conditions include one or more of a time condition, a temperature condition, a motion condition or a system event condition.

16. The method of claim 15, wherein the temperature condition includes a difference between a current temperature and a temperature associated with a previous offline calibration.

17. The method of claim 15, wherein the system event condition includes one or more of a power state, a charging state or a battery level.

18. The method of claim 14, further including updating the one or more trigger conditions in a calibration policy.

19. The method of claim 14, wherein one or more of a gyroscope, an accelerometer or a magnetometer are calibrated.

20. At least one non-transitory computer readable storage medium comprising a set of instructions, which when executed by a mobile platform, cause the mobile platform to:

detect one or more trigger conditions on the mobile platform, wherein the one or more trigger conditions are to be set in a policy database and include a time condition, temperature condition, a motion condition, and a system event condition, and wherein the one or more trigger conditions are to control the initiation of one or more of a hard and soft iron compensation procedure or a hard iron temperature compensation procedure;

activate an offline calibration of one or more sensors on the mobile platform in response to the one or more trigger conditions, wherein the one or more sensors include a temperature sensor, a motion sensor, and a magnetometer; and update an operational profile of the one or more sensors based on the offline calibration, wherein the operational profile us updated in an operational profile database to indicate a compensation to be applied to the one or more sensors in real-time in order to offset measurement errors.

21. The at least one non-transitory computer readable storage medium of claim 20, wherein the one or more trigger conditions include one or more of a time condition, a temperature condition, a motion condition or a system event condition.

22. The at least one non-transitory computer readable storage medium of claim 21, wherein the temperature condition includes a difference between a current temperature and a temperature associated with a previous offline calibration.

23. The at least one non-transitory computer readable storage medium of claim 21, wherein the system event condition includes one or more of a power state, a charging state or a battery level.

24. The at least one non-transitory computer readable storage medium of claim 20, wherein the offline calibration is to include a temperature compensation that is activated in response to the charging state corresponding to a battery of the mobile platform being charged.

25. The at least one non-transitory computer readable storage medium of claim 20, wherein one or more of a gyroscope, an accelerometer or a magnetometer are calibrated.

* * * * *